Dec. 16, 1930.  R. P. LANSING  1,785,319
ENGINE STARTER
Filed Jan. 10, 1927     10 Sheets-Sheet 1

Witness
Martin H. Olsen

Inventor
Raymond P. Lansing

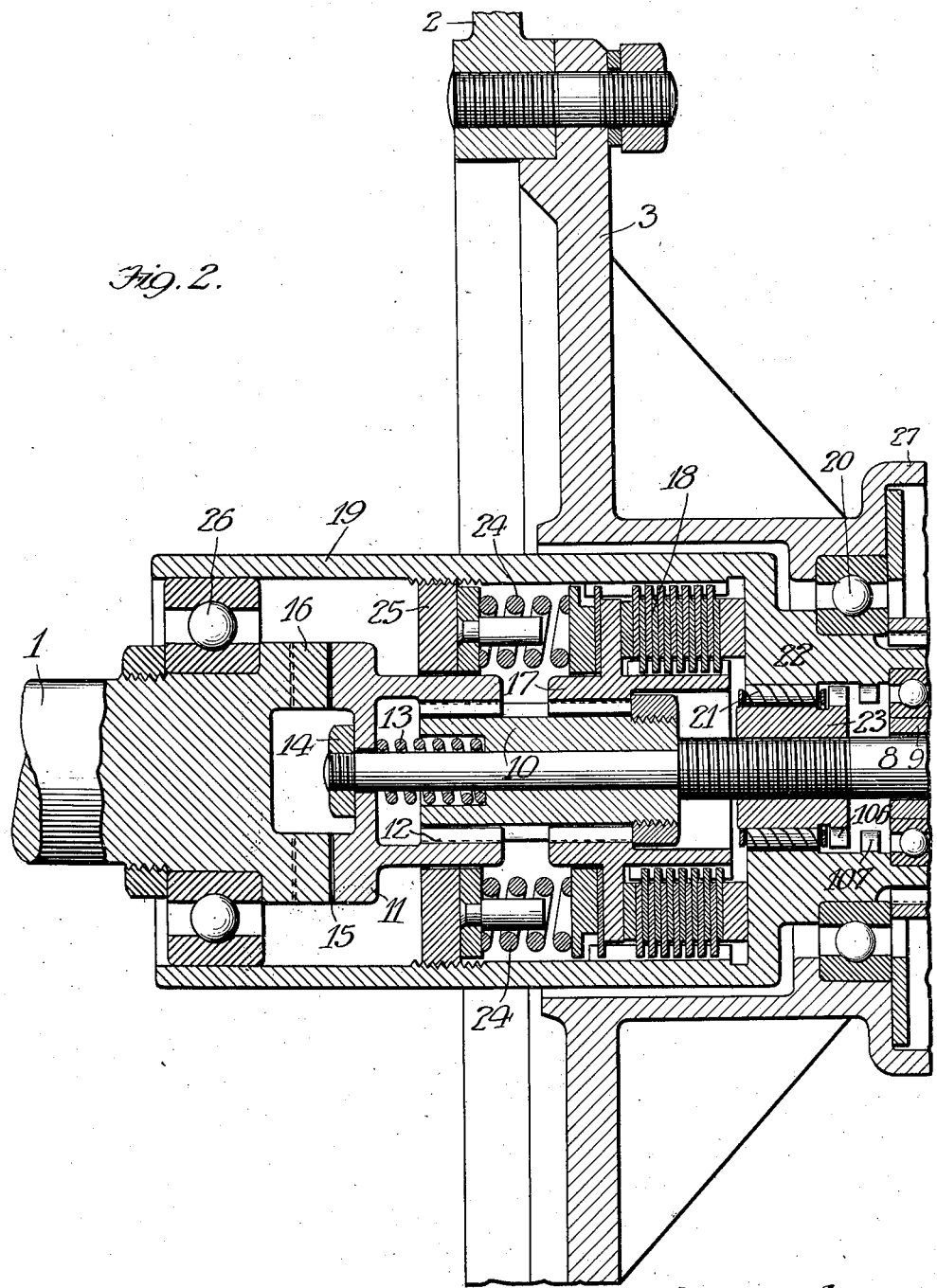

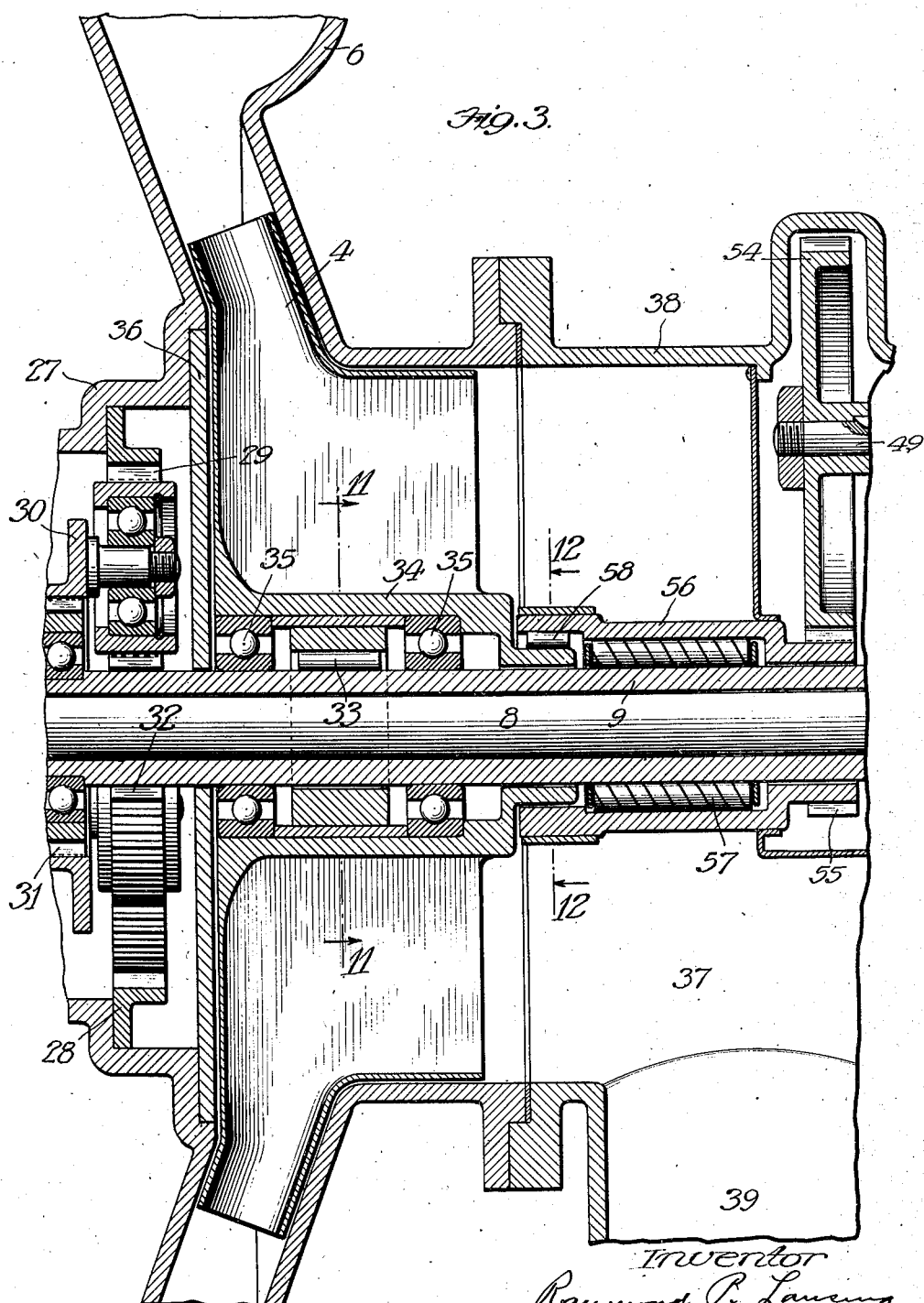

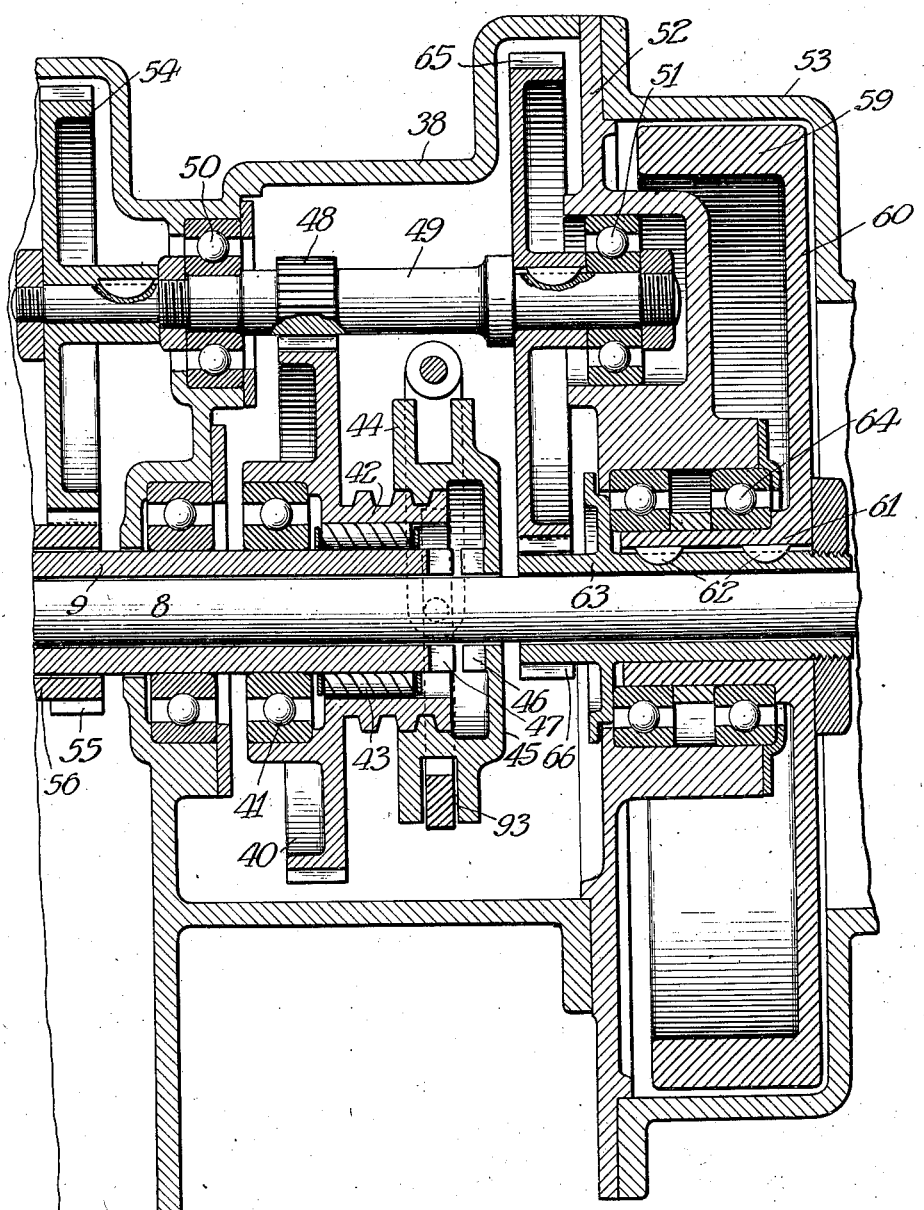

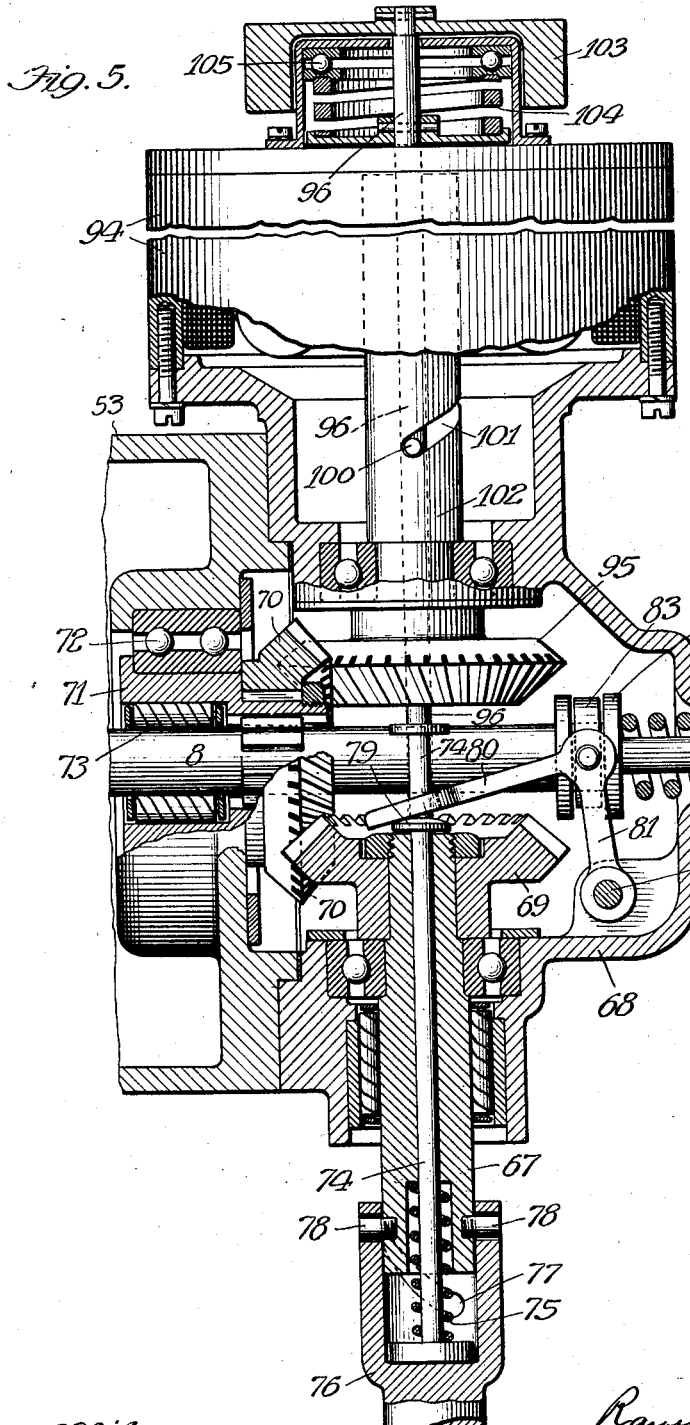

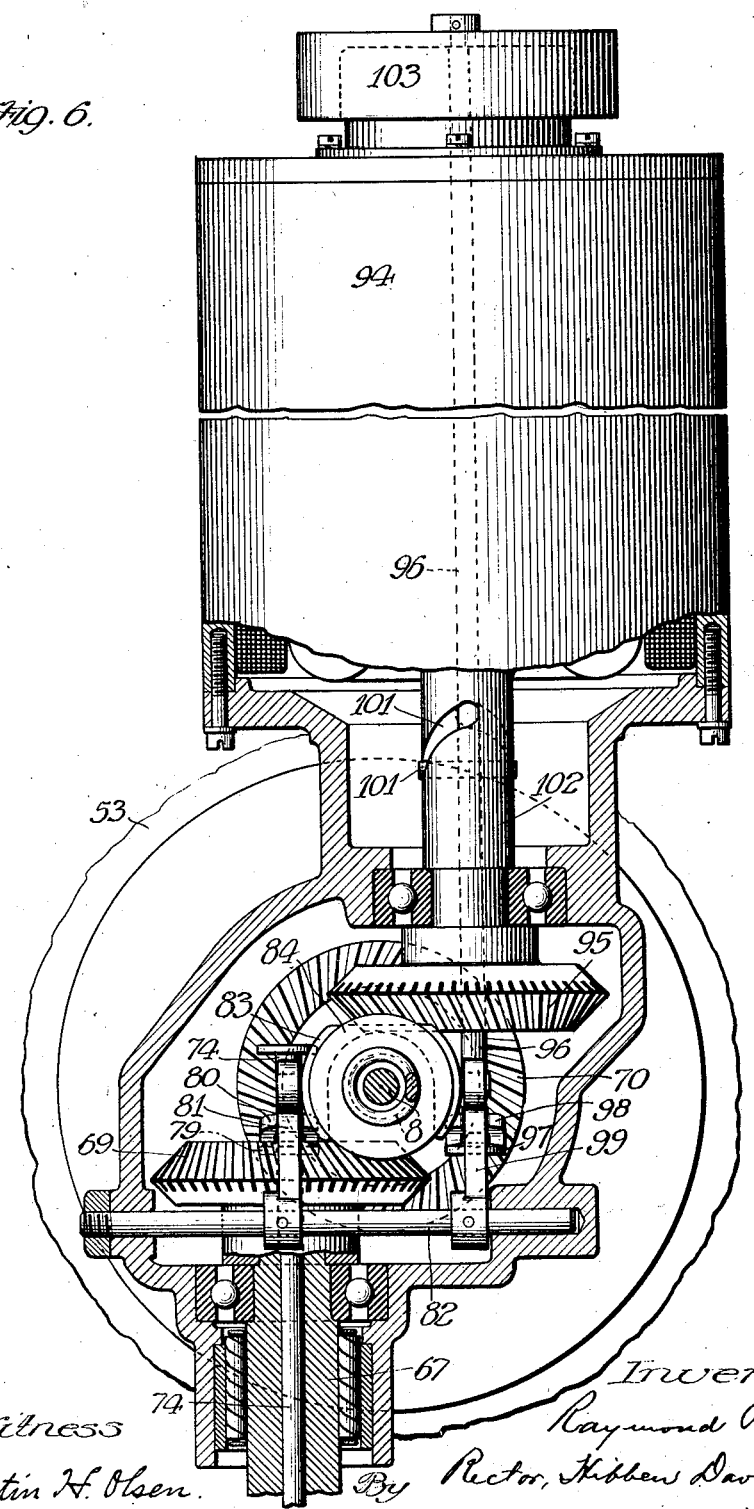

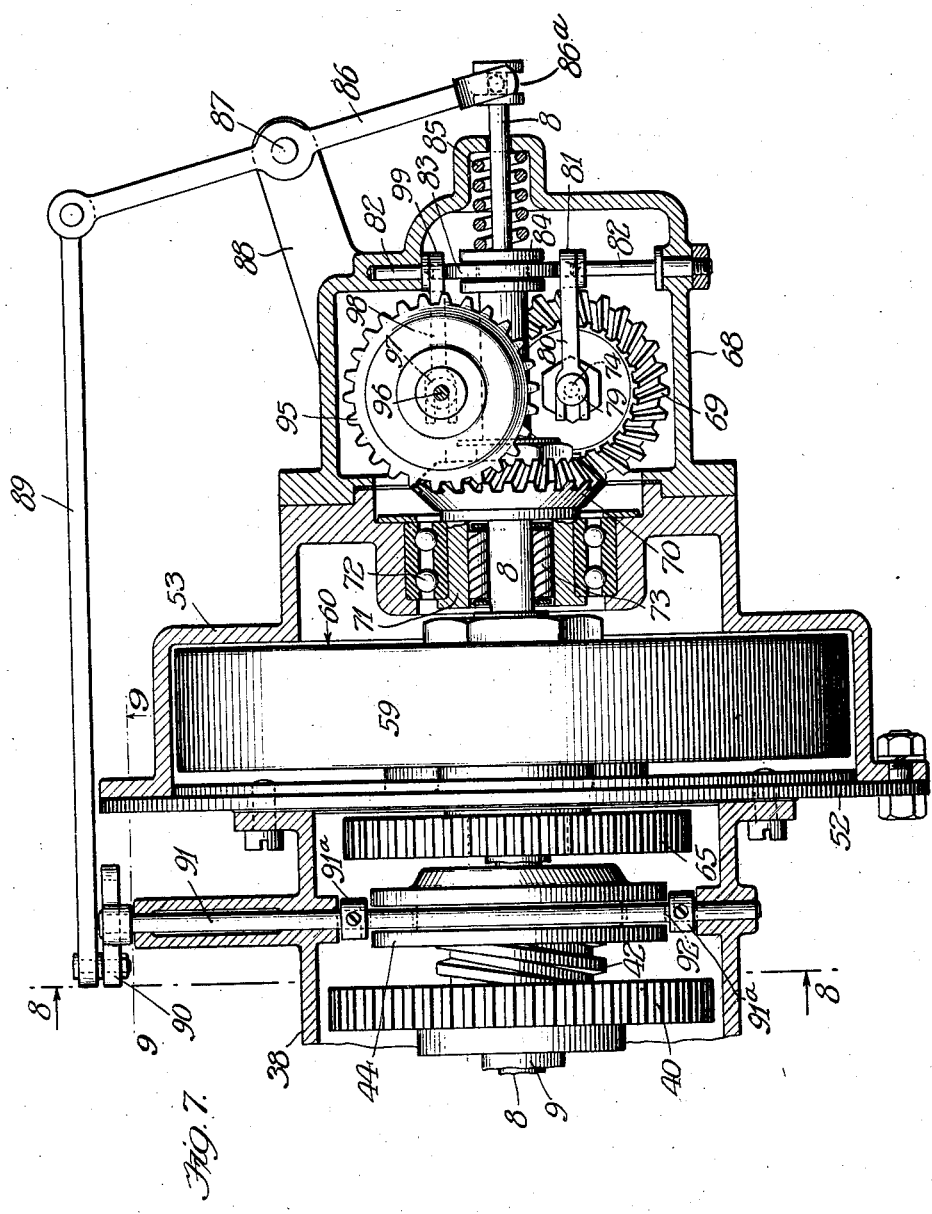

Dec. 16, 1930.   R. P. LANSING   1,785,319
ENGINE STARTER
Filed Jan. 10, 1927   10 Sheets-Sheet 8
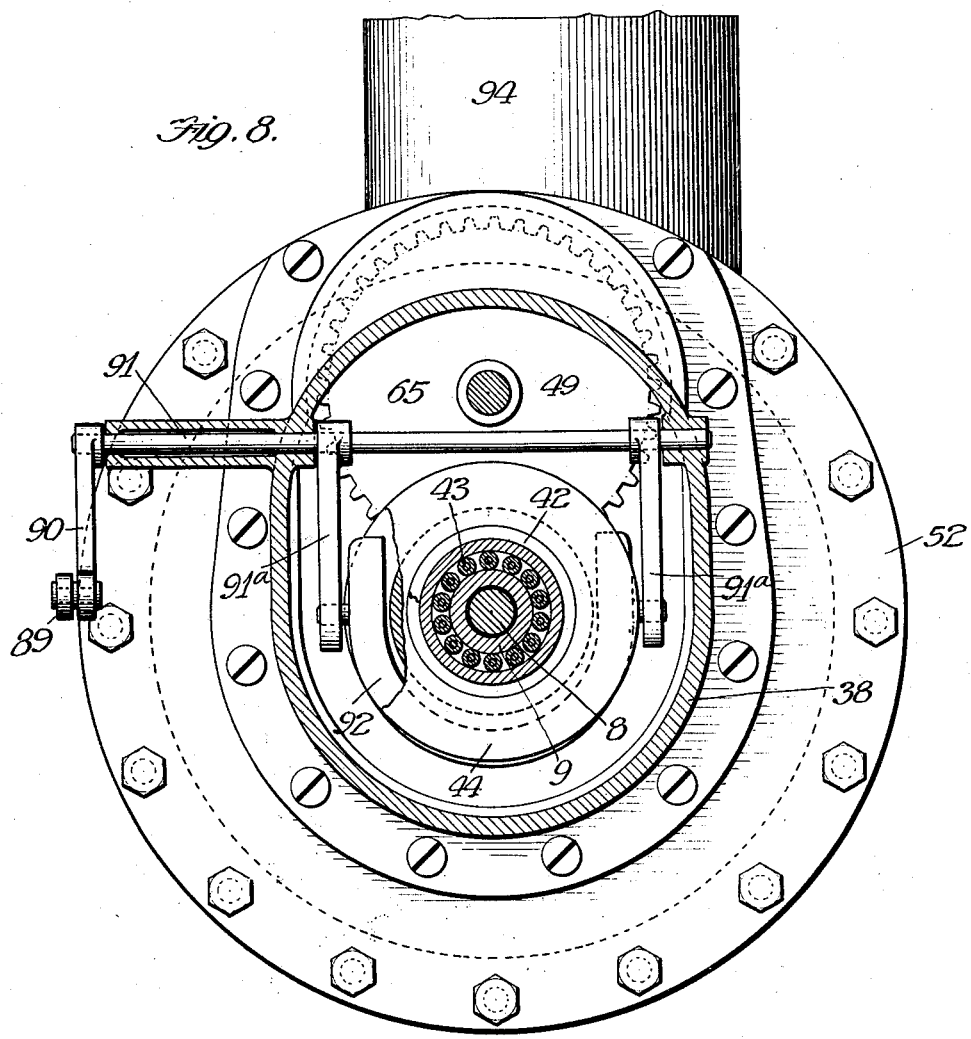
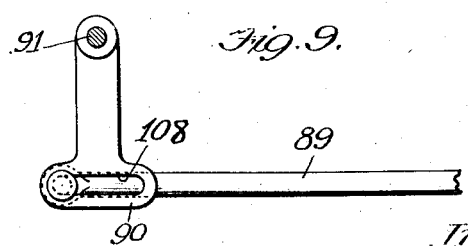

Dec. 16, 1930.  R. P. LANSING  1,785,319
ENGINE STARTER
Filed Jan. 10, 1927   10 Sheets-Sheet 9
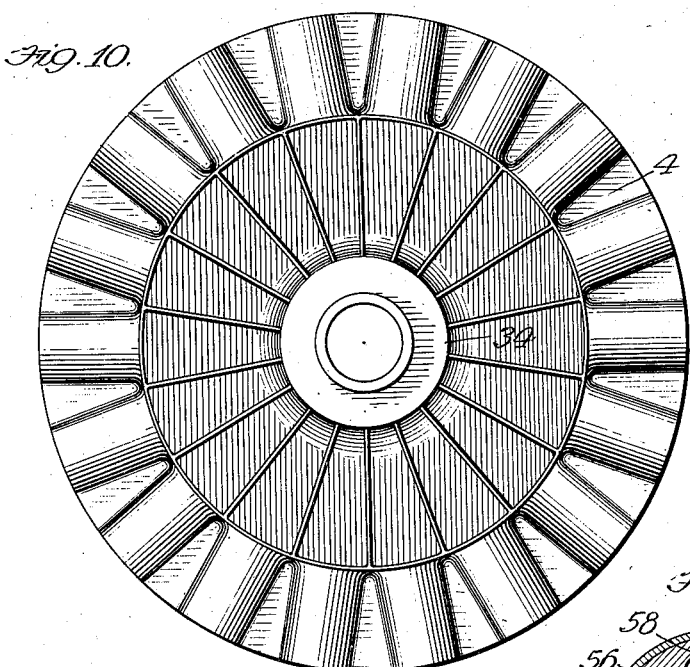
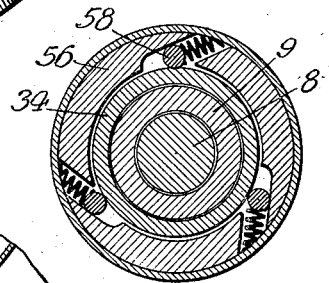
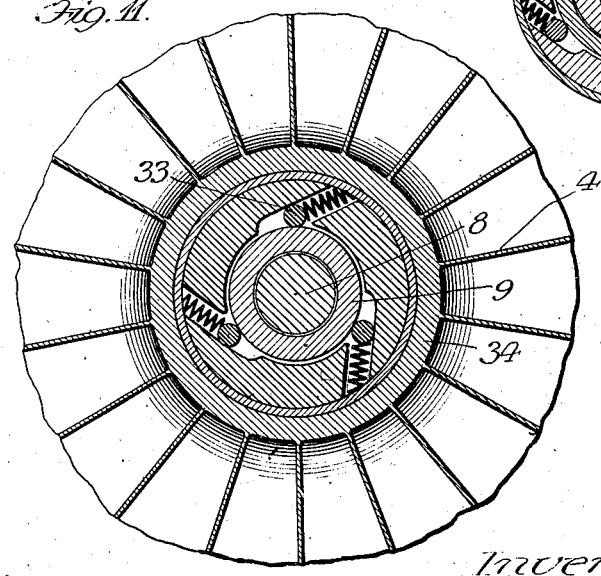

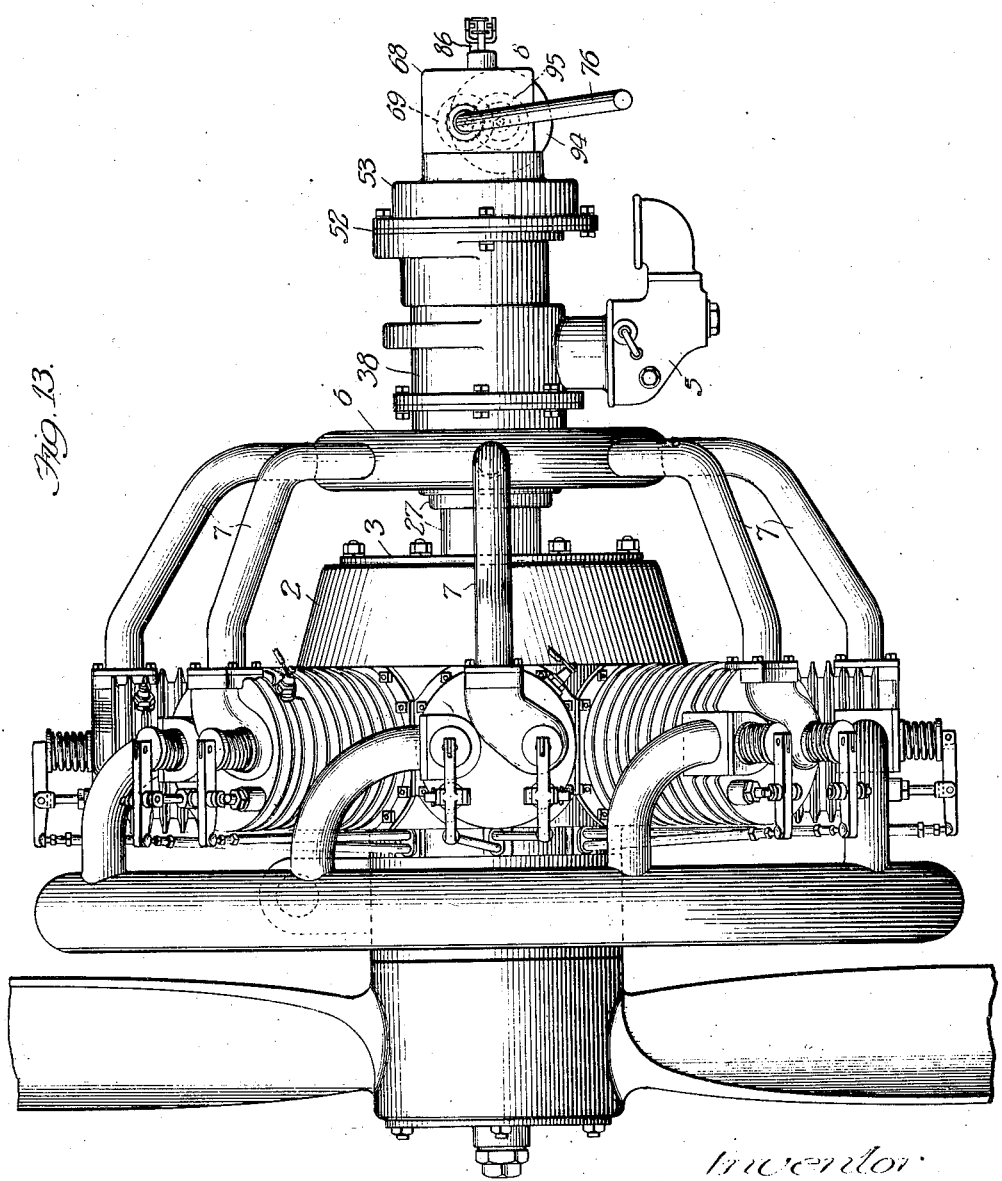

Patented Dec. 16, 1930

1,785,319

UNITED STATES PATENT OFFICE

RAYMOND P. LANSING, OF MONTCLAIR, NEW JERSEY, ASSIGNOR TO ECLIPSE MACHINE COMPANY, OF ELMIRA, NEW YORK, A CORPORATION OF NEW YORK

ENGINE STARTER

Application filed January 10, 1927. Serial No. 160,236.

My invention relates to apparatus for the starting or cranking of internal combustion engines and one object is to provide efficient and reliable means for this purpose, another object is to utilize the same transmission as the operating connection between the engine and a supercharger or other fuel pumping means of the engine and between the starting apparatus and such engine, and still another object is to incorporate such engine starting apparatus with such pumping means that the latter is driven by such apparatus in the cranking operation, as well as during the running of the engine. My apparatus is adapted to be actuated either manually or by power such as an electric motor, and either with or without an inertia means, and the construction and arrangement are such that the proper connections and disconnections are made in the apparatus as an incident to the act of operation of either of said actuating means.

In the drawings, Figure 1 is a longitudinal section of my apparatus showing a portion of the engine such as the crank shaft and crankcase and a portion of the carbureter;

Figs. 2, 3, 4 and 5 are similar sections which when placed side by side in said order represent enlargements of the entire structure or apparatus such as shown in Fig. 1;

Fig. 6 is a sectional elevation of the mechanism at the right-hand end of the apparatus including the power means and a portion of the manual means, such section being on the line 6—6 of Fig. 1;

Fig. 7 is a sectional elevation on the line 7—7 of Fig. 1;

Figure 1:
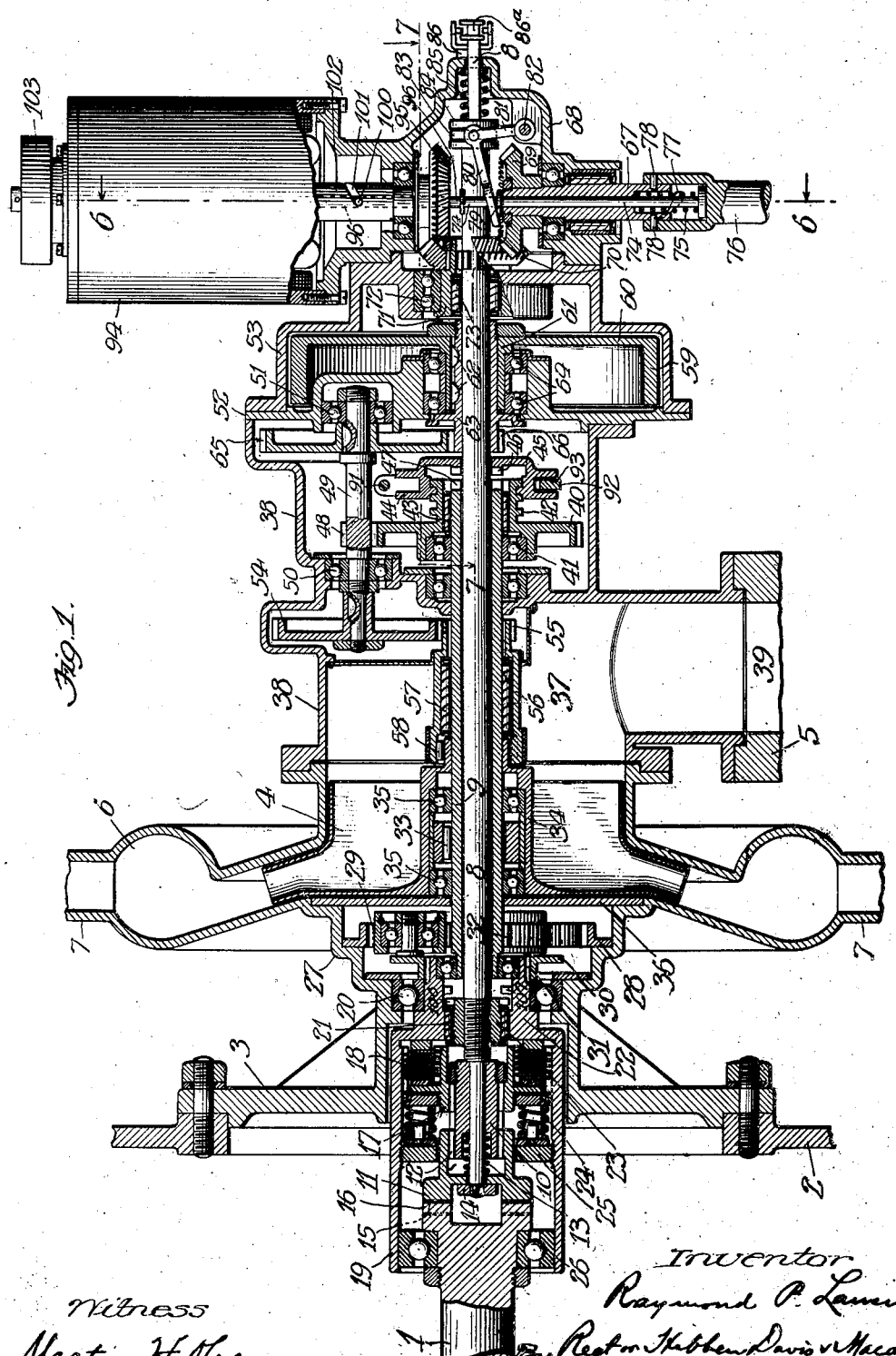

Figs. 8 and 9 are sections on the lines 8—8 and 9—9 respectively of Fig. 7;

Fig. 10 is an elevation of the supercharger impeller.

Figs. 11 and 12 are cross sections on the corresponding section lines of Fig. 3;

Fig. 13 is an elevation of my apparatus shown installed upon an engine.

While my invention may partake of different forms or embodiments, I have shown the same embodied in the apparatus illustrated in the drawings and hereinafter described without intention of limiting myself to the specific construction or details thereof. Moreover, while my apparatus has been invented and developed for cooperation with an airplane engine, and is so shown herein, it will be understood that my apparatus has useful and practical application to any other kind or type of internal combustion engine for the purpose of starting or cranking the same and for cooperating with a supercharger for the engine.

Referring to the particular embodiment of my invention as herein shown, the starting apparatus comprises the actuating means located at one end, in the present instance at the right hand end, and consisting of an electric motor and hand means, and adapted to be operatively connected through intermediate transmission or drive mechanism with some rotatable part of the engine to be started such as the crank shaft thereof, and also operatively connected with a supercharger which cooperates with the engine and its carbureter. As shown, the crank shaft 1 of the engine is located within the crankcase 2 in which an opening is provided covered by a detachable plate 3 which forms one of the bearings or supports for the starting apparatus. This apparatus cooperates with a supercharger having a rotor or impeller 4 which is in the present instance arranged concentric of the central axis of the apparatus and which cooperates with the engine carbureter 5 and with the casing 6 which in turn leads to the manifold 7 of the engine. Normally the supercharger is operatively connected with the engine and is therefore driven thereby when the engine is running, but the construction and arrangement are such that in the starting or cranking operation such connection is disabled or disconnected and the supercharger is driven by the power means or hand means as the case may be so that the supercharger shall be actuated and will function for facilitating the starting operation.

Referring to the details of the apparatus, a rotatable and longitudinally movable shaft 8 is arranged centrally of the apparatus in axial alignment with the crank shaft and extending throughout the entire length of such apparatus. It is located within a sleeve 9 which is rotatable but without any longitudinal movement and adapted to transmit torque as hereinafter explained. The shaft 8 is provided at its left-hand end with a clutch mechanism adapted to engage the crank shaft and also to transmit the torque of the engine to the supercharger. This clutch mechanism comprises a sleeve 10 mounted on shaft 8 and a clutch member 11 which is mounted thereon for rotary and for relative longitudinal movement in suitable manner as by means of the splines 12. This clutch member 11 is held outwardly yieldingly by means of the interposed spring 13 and such outward movement is limited by the nut 14 secured to the extreme outer end of the shaft 8. This clutch member 11 is provided with clutch jaws 15 adapted to cooperate with complementary clutch jaws 16 on the end of the shaft 1.

The torque of the engine is transmitted through this clutch mechanism to a rotatable sleeve 17 which is splined to the sleeve 10 and is operatively connected through a friction clutch 18 with a rotatable barrel 19 which is mounted in an opening in the plate 3 and located between the anti-friction bearings 20 and 21, the latter bearing being interposed between the projecting hub 22 of the barrel and a collar 23 screwing upon the shaft 8. The friction clutch is composed of two sets of friction plates which are splined respectively to the exterior of the sleeve 17 and interior of the barrel 19. The pressure upon these plates is adjustable by means of the series of coil spring 24 whose tension is adjustable by means of the nut 25. The inner end of the barrel 19 is also supported by anti-friction bearings 26. During the running of the engine the torque thereof is transmitted from the crank shaft and through the transmission described including the friction clutch and to the rotatable barrel 19 and its hub 22. When the shaft 8 is moved longitudinally, it is drivingly connected through the clutch teeth 106 and 107 with the hub 22.

The hub 22 of the barrel is operatively connected with the impeller of the supercharger in the following manner: The plate 3 is extended so as to form a casing 27 in which is located a suitable form of speed multiplying gearing which as here shown is of the planetary type comprising a fixed ring gear 28 secured to the interior of such casing and cooperating with a series of planetary pinions 29 mounted in a rotatable frame or cage 30 which is drivingly secured to the right-hand end of the hub 22 in a suitable manner as by means of the splines 31. These pinions mesh with a central gear 32 which is here shown as an integral part of the sleeve 9 whereby such sleeve is rotated by the engine through such planetary gearing.

The sleeve 9 is operatively connected through the one-way clutch 33 with the hub 34 of the rotor or impeller 4 of the supercharger, which hub is concentric of the central axis or shaft 8 of the apparatus and is mounted on the anti-friction bearings 35—35. This impeller is located within the extended portion of the casing 27 which is provided with the delivery or outlet portion 6, a plate 36 forming one end wall of the impeller chamber. The other end of this chamber communicates through a chamber 37 formed by an intermediate casing 38 with the outlet opening 39 of the carbureter whereby the explosive mixture supplied by the carbureter is impelled by the impeller 4 to the engine manifold 7.

My starting apparatus also includes an inertia means for storing up energy from the actuating means and delivering it suddenly to the engine for cranking the same, and also includes means for driving the impeller through some of the operating connections above described, and special operating connections whereby the supercharger may be caused to function during the cranking operation.

First describing such special operating connections, a gear 40 is mounted to rotate upon the sleeve 9 through anti-friction bearings 41 and the same is provided with an externally screw-threaded hub 42 between which hub and sleeve is interposed an anti-friction bearing 43. A screw member or nut 44 is threaded upon such hub 43, the threads being of high-pitch so that longitudinal pressure upon such nut will cause the same to rotate and move longitudinally upon said hub. This nut is provided with an end wall 45 centrally through which the shaft 8 passes and on the inner face of which there are provided clutch jaws 46 adapted when shifted longitudinally to the left to engage complementary clutch jaws 47 on the right-hand end of the sleeve 9.

The gear 40 meshes with a pinion 48 secured to or forming a part of the short countershaft 49 suitably mounted in the casing 38 by means of the anti-friction bearings 50 and 51 and the end plate 52 which is clamped between the casing 38 and an end casing 53. To the left-hand end of this shaft 49 there is secured a gear 54 which meshes with pinion teeth 55 which is here shown as formed integral with a rotatable sleeve 56, mounted upon the sleeve 9 through the medium of anti-friction bearings 57. This sleeve 56 is operatively connected through the one-way clutch 58 with the hub 34 of the impeller. The direction of the transmission of torque is from the sleeve 56 through the clutch 58 to the impeller. Consequently, when the screw member 44 is moved to the left to cause a driving connection between it and the sleeve 9 the torque is transmitted from such sleeve through the screw member to the gear 40 and thence through the train of gearing to the impeller 4.

Next describing the inertia means, the same comprises a flywheel consisting of a rim 59 of the proper mass or weight, a web 60 and a hub 61 which latter is secured in suitable manner as by the keys 62 to a central sleeve 63 mounted to rotate concentric of the central shaft 8. This hub 61 is mounted to rotate within a central opening of the plate 52 through the medium of the anti-friction bearings 64. To the right-hand end of the shaft 49 there is secured a gear 65 which meshes with pinion teeth 66 here formed integral with the sleeve 63 so that when the shaft 49 is rotated by the actuating means either power or manual, the sleeve 63 and consequently the flywheel are rapidly rotated.

Referring next to the actuating means, located at the extreme right-hand end of the apparatus, and first describing the manual means, the same comprises a cranking shaft 67 which is mounted to rotate within a casing 68 and which extends thereinto. At its inner or upper end such shaft is provided with a bevel pinion 69 which meshes with a corresponding bevel pinion 70 secured to the central shaft 8 through the medium of a sleeve 71 which is drivingly secured to such pinion 70 and to the shaft 8. This sleeve 71 is mounted to rotate within a central opening in the casing 53 through the medium of the anti-friction bearings 72 and 73.

A control rod 74 extends through a central bore of the cranking shaft 67 and is held in an outward position from the outer end of such shaft by a spring 75. When a suitable hand crank such as shown at 76 is applied by the operator the usual spiral slots 77 engage the cranking pins 78 of the shaft 67 and continued movement inwardly of the hand crank forces the rod 74 inwardly for the purpose of shifting the rod 8 longitudinally to the right and the screw member 44 to the left automatically and as an incident to the actuation of the manual means.

To such latter end the rod 74 is provided with a collar 79 which engages an arm 80 connected to or forming a part of a lever 81 fulcrumed on a cross shaft 82 in the casing 68. This lever 81 cooperates with a shifter shoe 83 engaging in the circumferential groove of a shifter collar 84 which is secured to or a part of the shaft 8. Consequently the act of applying the hand crank 76 forces the rod 74 inwardly and rocks the lever 81 thereby shifting the rod 8 to the right against the tension of the coil spring 85 which tends to hold such shaft in its normal or left-hand position.

The shaft 8 extends through the casing 68 and is operatively connected at its projecting end through suitable linkage with the screw member 44. As shown in detail in Fig. 7, this linkage comprises a lever 86 of the first class pivoted at 87 to a bracket 88 of the casing 68 and yoke-engaged at one end with groove 86ª of the shaft 8, and at its other end to a link 89 whose other end is pivotally connected to a rock arm 90. This latter arm is secured to a rock shaft 91 mounted in the casing 38 and provided intermediate its length with a shipper shoe 92 carried by arms 91ª and engaging in the circumferential groove 93 of the screw member 44. Consequently the longitudinal shifting of the shaft 8 to the right is accompanied by a shifting of the screw member 44 to the left along the screw threads which are of such lead as to permit such movement, with the result that operative connection is established between the sleeve 9 and the screw member and consequently with the supercharger and also with the inertia means, it being understood that at this time the operating connection between the apparatus and the engine is disestablished.

Referring next to the power means which is here in the form of an electric motor 94, the armature shaft thereof is extended and provided at its inner end with a bevel pinion 95 adapted to mesh with the bevel pinion 70. The bevel pinions 69 and 95 are known as hypoid gears because of their off-set relationship as regards the bevel pinion 70.

A rod 96 passes centrally through the armature shaft for longitudinal movement therein. This rod is provided at its lower end with a collar 97 which is adapted to engage an arm 98 extending as a lateral branch of a lever 99 mounted to rock upon the cross shaft 82. This lever 99 cooperates with the shifter shoe 83 which is secured between this lever 99 and lever 81. For automatically operating the rod 96 and consequently shifting the shaft 8 to the right automatically, such rod 96 is provided with a pin 100 cooperating with a spiral slot 101 in the armature shaft 102 so that when the armature shaft is rotated the rod 96 will be moved upwardly and the shaft 8 shifted as hereinbefore described. An inertia weight 103 is mounted upon the upper end of the rod or plunger 96 so that when the armature starts to rotate, such rod has a tendency to resist rotation and the rod 96 is therefore moved longitudinally in the manner above explained. After the flywheel has been brought up to speed and the current has been cut off from the motor, such inertia weight has sufficient inertia to over-ride the armature and thus lower the rod 96, assisted by the coil spring 104. A thrust bearing 105 is provided to relieve friction at the end of this spring.

Describing a cycle of operation and starting with the parts in their relative position shown in Figs. 1 to 5, this is the normal position and the engine is drivingly connected with the supercharger through the clutch jaws 15 and 16 and through the transmission mechanism at the left-half end of the apparatus and through the planetary gearing, sleeve 9 and one-way clutch 33. Also in such normal position the actuating means such as the motor and manual means are disconnected from the supercharger because the driving connection between the sleeve 9 and screw member 44 is disestablished. Now assuming that it is desired to crank and start the engine and that it is to be cranked by the manual means, the operator applies the hand crank to the shaft 67 whereupon the rod 74 is automatically operated and the shaft 8 is automatically shifted to the right by means of the shifter connections between it and such rod 74. Simultaneously the linkage between the shaft 8 and the screw member 44 shifts the latter longitudinally so as to establish driving relation between it and the sleeve 9 through the clutch jaws 46 and 47, whereupon the sleeve 9 will be operatively connected with the inertia means and also with the impeller. The rotation of the shaft 8 by the cranking shaft 67 through the bevel gears 69 and 70 will be transmitted through the clutch mechanism at the left-hand end of such shaft 8 and through the splines or clutch teeth 106 and 107 (now in engagement by reason of the longitudinal movement of shaft 8) to the hub of barrel 19 and through the planetary gearing to the sleeve 9, from whence the torque of the cranking shaft is transmitted eventually to the inertia means or flywheel and to the impeller. In practice and according to the construction as herein shown, there is a 6 to 1 multiplication at the planetary gearing, a 5 to 1 multiplication at the screw member and its gear 40 and further 5 to 1 multiplication by reason of the gear 54 and pinion 55, with the result that the rotation of the hand crank at a given speed will drive the impeller at an increased ratio of substantially 150 to 1, thereby charging the cylinders with the mixture by means of the supercharger prior to the starting operation and also enabling the flywheel to be rotated at a high speed. The sleeve 9 and the gear 40 are drivingly connected by means of the screw member 44 and the coarse pitch threads which are of such direction that the threads hold engagement when the torque passes from such gear to the sleeve, but with the torque passing in the opposite direction the linkage exerts sufficient pressure to maintain such engagement.

When the flywheel has been brought up to the desired R. P. M., cessation of cranking automatically permits the rod or plunger 74 to drop and the shaft 8 will be restored to its normal or left-hand position by the tension of spring 85. The driving connection between this shaft 8 and the engine which had been disconnected when the shaft was shifted to the right is now re-established and the parts are now in position to permit of the transmission or delivery of the flywheel energy to the engine for cranking purposes. The gear 40 and sleeve 9 remain in operative connection by virtue of the thread action of the screw member while the flywheel is expending its energy in cranking the engine, but just as soon as the engine starts and attempts to reverse the direction of torque through such members, the screw member will overrun the threads and disengagement will take place between the gear 40 and the sleeve 9. The apparatus then functions as a driving means for the supercharger.

As shown in Fig. 9, the linkage between the shaft 8 and the screw member 44 is provided with sufficient back lash through the provision of the slot 108 in the arm 90, so that the linkage may retract upon the disengaging of the clutch jaws 46 and 47 which established the driving relation between the sleeve and the gear 40.

The actuation of the shaft 8 and the accompanying results are substantially the same when the motor constitutes the actuating means. When the motor is energized its rod 96 will be actuated so as to shift the shaft 8 to the right and when the motor is de-energized and the engine has been cranked and started the shaft 8 will resume its normal or left-hand position.

In the cranking operation, the transmission of the energy of the flywheel is through the gearing 66 and 65, shaft 49, gearing 48 and 40, screw member 44, clutch jaws 46 and 47, sleeve 9, planetary gearing, barrel 19, clutch 18 and sleeves 17 and 10 and clutch 11 to the engine. In this operation, the planetary gearing acts as reduction gearing.

The friction clutch 18 acts as a yieldable driving connection between the engine and the supercharger and as an overload torque release in the transmission of the torque from the flywheel to the engine, and in addition acts as a backfire release. In case of the sudden slowing or stopping of the engine, the impeller 4 is permitted to continue its high rate of rotation by virtue of the provision of the one-way clutch 33, thereby maintaining more nearly uniform speed thereof rather than following the fluctuating engine speeds.

Insofar as this invention in its broader aspect is concerned it is not essential that the supercharger be operated by the starter apparatus during the time of the flywheel acceleration and in such event the impeller drive from the shaft 49 to hub 34 would be omitted. In the cranking operation, that is when the flywheel is delivering its energy the consequent rotation of the sleeve 9 would rotate the impeller through the clutch 33, but this would not be effective speed for such impeller.

I claim:

1. In combination with an internal combustion engine and its carburetor and with a supercharger therefor adapted to be operated by the engine, an engine starter drive adapted to be engaged with and to crank the engine for starting the same and to be operatively connected with the supercharger to operate it independently of the engine.

2. In combination with an internal combustion engine and its carburetor and with a supercharger therefor adapted to be operated by the engine, a transmission between the engine and the supercharger, and an engine starter drive adapted to be engaged with and to crank the engine for starting the same and to be operatively connected with the supercharger to operate it, said transmission being normally operatively connected with the engine but adapted to be disconnected therefrom when the starter drive is driving the supercharger.

3. In combination with an internal combustion engine and its carburetor and with a supercharger therefor adapted to be operated by the engine, an engine starter drive adapted to be engaged with and to crank the engine for starting the same and to be operatively connected with the supercharger to operate it independently of the engine, said drive being normally operatively disconnected from the engine and from the supercharger.

4. In combination with an internal combustion engine and its carburetor and with a supercharger therefor adapted to be operated by the engine, an engine starter drive adapted to be engaged with and to crank the engine for starting the same and to be operatively connected with the supercharger to operate it, and an inertia means combined and co-operating with the starter drive for accumulating energy for starting when the drive is operated and the supercharger is thereby driven to preliminarily charge the engine cylinders with explosive mixture.

5. In combination with an internal combustion engine and its carburetor and with a supercharger therefor adapted to be operated by the engine, an engine starter drive adapted to be engaged with and to crank the engine for starting the same and to be operatively connected with the supercharger to operate it, said starter drive including means for disconnecting the supercharger from the engine and connecting it with such drive when the latter is operated.

6. In combination with an internal combustion engine and its carburetor and with a supercharger therefor adapted to be operated by the engine, an engine starter drive adapted to be engaged with and to crank the engine for starting the same and to be operatively connected with the supercharger to operate it, and speed multiplying driving means between the supercharger and starter drive.

7. In combination with an internal combustion engine and its carburetor and with a supercharger therefor adapted to be operated by the engine, an engine starter drive adapted to be engaged with and to crank the engine for starting the same and to be operatively connected with the supercharger to operate it, and speed multiplying driving means between the supercharger and starter drive, said drive including means for disconnecting the supercharger from the engine and connecting it with such drive when the latter is operated.

8. In combination with an internal combustion engine and its carburetor and with a supercharger therefor adapted to be operated by the engine, an engine starter drive adapted to be engaged with and to crank the engine for starting the same and to be operatively connected with the supercharger to operate it, and speed multiplying driving means between the supercharger and starter drive, and an inertia means for accumulating energy from the operation of the starter drive, said drive including means for connecting the inertia means with the drive when the latter is operated.

9. In combination with an internal combustion engine and its carburetor and with a supercharger therefor adapted to be operated by the engine, an engine starter drive adapted to be engaged with and to crank the engine for starting the same and to be operatively connected with the supercharger to operate it, and speed multiplying driving means between the supercharger and starter drive, and an inertia means for accumulating energy from the operation of the starter drive, said drive including means for connecting the inertia means with the drive when the latter is operated, and also including means for disconnecting the supercharger from the engine during the time that the drive operates the inertia means and the supercharger.

10. In combination with an internal combustion engine and its carburetor and with a supercharger therefor adapted to be operated by the engine, an engine starter drive adapted to be engaged with and to crank the engine for starting the same and to be operatively connected with the supercharger to operate it, and speed multiplying driving means between the supercharger and starter drive, and an inertia means for accumulating energy from the operation of the starter drive, said drive having operating connections normally disconnected with the inertia means and the supercharger but adapted to be connected therewith as an incident to the operation of the starter drive.

11. In combination with an internal combustion engine and its carburetor and with a supercharger therefor adapted to be operated by the engine, an engine starter drive adapted to be engaged with and to crank the engine for starting the same and to be operatively connected with the supercharger to operate it, speed multiplying driving means between the supercharger and starter drive, an inertia means for accumulating energy from the operation of the starter drive, and speed multiplying driving means between the inertia means and the starter drive.

12. In combination with an internal combustion engine and its carburetor and with a supercharger therefor adapted to be operated by the engine, an engine starter drive adapted to be engaged with and to crank the engine for starting the same and to be operatively connected with the supercharger to operate it, speed multiplying driving means between the supercharger and starter drive, an inertia means for accumulating energy from the operation of the starter drive, and speed multiplying driving means between the inertia means and the starter drive, said starter drive being normally disconnected from the inertia means but adapted to be connected therewith as an incident to the operation of the drive.

13. In combination with an internal combustion engine and its carburetor and with a supercharger therefor adapted to be operated by the engine, an engine starter drive adapted to be engaged with and to crank the engine for starting the same and to be operatively connected with the supercharger to operate it, speed multiplying driving means between the supercharger and starter drive, an inertia means for accumulating energy from the operation of the starter drive, and speed multiplying driving means between the inertia means and the starter drive, said starter drive being normally disconnected from the inertia means but adapted to be connected therewith as an incident to the operation of the drive, and to be automatically disconnected therefrom when the engine starts on its own power.

14. In combination with an internal combustion engine and its carburetor and with a supercharger therefor adapted to be operated by the engine, an engine starter drive adapted to be engaged with and to crank the engine for starting the same and to be operatively connected with the supercharger to operate it, speed multiplying driving means between the supercharger and starter drive, an inertia means for accumulating energy from the operation of the starter drive, and speed multiplying driving means between the inertia means and the starter drive, said starter drive being normally disconnected from the inertia means and the supercharger but adapted to be connected with both of them as an incident to the operation of the drive.

15. In combination with an internal combustion engine and its carburetor and with a supercharger therefor adapted to be operated by the engine, an engine starter drive adapted to be engaged with and to crank the engine for starting the same and to be operatively connected with the supercharger to operate it, speed multiplying driving means between the supercharger and starter drive, an inertia means for accumulating energy from the operation of the starter drive, and speed multiplying driving means between the inertia means and the starter drive, said supercharger being normally operatively connected with the engine but adapted to be disconnected therefrom as an incident to the operation of the starter drive and the operative connection of the latter with the supercharger and inertia means.

16. In combination with an internal combustion engine and its carburetor and with a supercharger therefor adapted to be operated by the engine, an engine starter drive adapted to be engaged with and to crank the engine for starting the same and to be operatively connected with the supercharger to operate it, said supercharger being normally operatively connected with the engine but adapted to be disconnected therefrom as an incident to the operation of the starter drive and the operative connection of the latter with the supercharger.

17. In combination with an internal combustion engine and its carburetor and with a supercharger therefor adapted to be operated by the engine, a transmission between the engine and the supercharger including speed multiplying gearing, and an engine starter drive adapted to be engaged with and to thereby drive such gearing and the supercharger and to be thereafter operatively engaged with and to crank the engine through said transmission.

18. In combination with an internal combustion engine and its carburetor and with a supercharger therefor adapted to be operated by the engine, a transmission between the engine and the supercharger including speed multiplying gearing, and an engine starter drive adapted to be engaged with and to thereby drive such gearing and the supercharger and to be thereafter operatively engaged with and to crank the engine through said transmission, said transmission being normally operatively connected with the engine but adapted to be disconnected therefrom as an incident to the connection of the starter drive with said gearing.

19. In combination with an internal combustion engine and its carburetor and with a supercharger therefor adapted to be operated by the engine, an engine starter drive adapted to be engaged with and to crank the engine for starting the same and to be operatively connected with the supercharger to operate it, said supercharger being an air impeller which is disposed concentrically of the starter drive.

20. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a central rotatable shaft and said supercharger being an air impeller which is disposed concentrically of such shaft.

21. In combination with an internal combustion engine and its carburetor and with a supercharger therefor adapted to be operated by the engine, an engine starter drive adapted to be engaged with and to crank the engine for starting the same and to be operatively connected with the supercharger, to operate it, and an inertia means for accumulating the energy of the operation of the starter drive, said supercharger and the inertia means being disposed concentrically of the starter drive.

22. In combination with an internal combustion engine and its carburetor and with a supercharger therefor adapted to be operated by the engine, an engine starter drive adapted to be engaged with and to crank the engine for starting the same and to be operatively connected with the supercharger to operate it, said starter drive being constructed and arranged to control the connection from the engine to the supercharger and from itself to the supercharger.

23. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger.

24. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, and a transmission between the engine and the supercharger, the operative connection between such transmission and the engine being controlled by such shaft in its longitudinal movements.

25. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, a transmission between the engine and the supercharger and including a sleeve surrounding such shaft, and an inertia means adapted to be connected with such sleeve.

26. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, a transmission between the engine and the supercharger and including a sleeve surrounding such shaft, and an inertia means adapted to be connected with such sleeve by the actuation of the starter drive and to be automatically disconnected therefrom as the result of the operation of the engine under its own power.

27. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, a transmission between the engine and the supercharger, and including a sleeve surrounding such shaft, actuating means for said shaft independent of the engine, a one-way clutch operating between the sleeve and the supercharger and forming a driving connection when the engine is operating, and a second one-way clutch operating between such sleeve and the supercharger and forming a driving connection when the actuating means is operating.

28. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, a transmission between the engine and the supercharger, and including a sleeve surrounding such shaft, actuating means for said shaft independent of the engine, a one-way clutch operating between the sleeve and the supercharger and forming a driving connection when the engine is operating, a second one-way clutch operating between such sleeve and the supercharger and forming a driving connection when the actuating means is operating, and speed multiplying means between the shaft and first clutch and between the sleeve and the second clutch.

29. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, a transmission between the engine and the supercharger, and including a sleeve surrounding such shaft, actuating means for said shaft independent of the engine, a one-way clutch operating between the sleeve and the supercharger and forming a driving connection when the engine is operating, a second one-way clutch operating between such sleeve and the supercharger and forming a driving connection when the actuating means is operating, speed multiplying means between the shaft and first clutch and between the sleeve and the second clutch, and a rotatable inertia means operatively connected with said sleeve through the speed multiplying means which is located between the sleeve and second clutch.

30. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, a transmission between the engine and the supercharger, and including a sleeve surrounding such shaft, actuating means for said shaft independent of the engine, a one-way clutch operating between the sleeve and the supercharger and forming a driving connection when the engine is operating, a second one-way clutch operating between such sleeve and the supercharger and forming a driving connection when the actuating means is operating, speed multiplying means between the shaft and first clutch and between the sleeve and the second clutch, and a rotatable inertia means operatively connected with said sleeve through the speed multiplying means which is located between the sleeve and second clutch, said last named speed multiplying means being in two sets, one set cooperating with said inertia means and both sets cooperating with the supercharger.

31. In combination with an internal combustion engine and its carburetor and with a supercharger therefor adapted to be operated by the engine, an engine starter drive adapted to be engaged with and to crank the engine for starting the same and to be operatively connected with the supercharger to operate it, a transmission between the engine and the supercharger including speed multiplying means and adapted to be driven either by the engine or the drive, and a separate operating connection between such transmission and supercharger for driving the supercharger when the starter drive is actuated.

32. In combination with an internal combustion engine and its carburetor and with a supercharger therefor adapted to be operated by the engine, an engine starter drive adapted to be engaged with and to crank the engine for starting the same and to be operatively connected with the supercharger to operate it, a transmission between the engine and the supercharger including speed multiplying means and adapted to be driven either by the engine or the drive, and also including a one-way clutch in the connection with the supercharger, and a separate operating connection between such transmission including speed multiplying means for driving the supercharger when the starter drive is actuated.

33. In combination with an internal combustion engine and its carburetor and with a supercharger therefor adapted to be operated by the engine, an engine starter drive adapted to be engaged with and to crank the engine for starting the same and to be operatively connected with the supercharger to operate it, a transmission between the engine and the supercharger including speed multiplying means and adapted to be driven either by the engine or the drive, and also including a one-way clutch in the connection with the supercharger, and a separate operating connection between such transmission including speed multiplying means and a one-way clutch for driving the supercharger when the starter drive is actuated.

34. In combination with an internal combustion engine and its carburetor and with a supercharger therefor adapted to be operated by the engine, an engine starter drive adapted to be engaged with and to crank the engine for starting the same and to be operatively connected with the supercharger to operate it, a transmission between the engine and the supercharger including speed multiplying means and adapted to be driven either by the engine or the drive, and a separate operating connection between such transmission and supercharger including speed multiplying means.

35. In combination with an internal combustion engine and its carburetor and with a supercharger therefor adapted to be operated by the engine, an engine starter drive adapted to be engaged with and to crank the engine for starting the same and to be operatively connected with the supercharger to operate it, and means for operating the supercharger at different gear ratios accordingly as the engine or the starter drive is the driver.

36. In combination with an internal combustion engine and its carburetor and with a supercharger therefor adapted to be operated by the engine, an engine starter drive adapted to be engaged with and to crank the engine for starting the same and to be operatively connected with the supercharger to operate it, and means for operating the supercharger at a predetermined gear ratio when the engine is the driver and at a higher predetermined gear ratio when the starter drive is the driver.

37. In combination with an internal combustion engine and its carburetor and with a supercharger therefor, an engine starter drive adapted to be engaged with and to crank the engine for starting the same, and speed multiplying means connecting between the engine and starter drive and supercharger.

38. In combination with an internal combustion engine and its carburetor and with a supercharger therefor, an engine starter drive adapted to be engaged with and to crank the engine for starting the same, and speed multiplying means connecting between the engine and starter drive and supercharger, a portion of said speed multiplying means being in common as respects said engine and starter drive.

39. In combination with an internal combustion engine and its carburetor and with a supercharger therefor, an engine starter drive adapted to be engaged with and to crank the engine for starting the same, and speed multiplying means connecting between the engine and starter drive and supercharger for driving the latter at different speed ratios.

40. In combination with an internal combustion engine and its carburetor and with a supercharger therefor, an engine starter drive adapted to be engaged with and to crank the engine for starting the same, and speed multiplying means connecting between the engine and starter drive and supercharger whereby the latter is driven at a predetermined speed ratio by the engine and whereby it is driven at a higher predetermined speed ratio by said starter drive.

41. In combination with an internal combustion engine and its carburetor and with a supercharger therefor adapted to be operated by the engine, an engine starter drive adapted to be engaged with and to crank the engine for starting the same and to be operatively connected with the supercharger to operate it, and a transmission operatively connecting between the engine and the supercharger and controlled, as respects its connection with the engine, by said drive.

42. In combination with an internal combustion engine and its carburetor and with a supercharger therefor adapted to be operated by the engine, an engine starter drive adapted to be engaged with and to crank the engine for starting the same and to be operatively connected with the supercharger to operate it, and a transmission operatively connecting between the engine and the supercharger and normally in engagement with the engine, said transmission being adapted to be disengaged from the engine by said starter drive.

43. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, and a transmission operatively connecting between the engine and the supercharger and controlled, as respects its connection with the engine, by said shaft.

44. In combination with an internal combustion engine and its carburetor and with a supercharger therefor adapted to be operated by the engine, an engine starter drive adapted to be engaged with and to crank the engine for starting the same and to be operatively connected with the supercharger to operate it, and two trains for transmission of the torque to the supercharger from the engine and from the drive respectively.

45. In combination with an internal combustion engine and its carburetor and with a supercharger therefor adapted to be operated by the engine, an engine starter drive adapted to be engaged with and to crank the engine for starting the same and to be operatively connected with the supercharger to operate it, and two trains for transmission of the torque to the supercharger from the engine and from the drive respectively, said trains being partly in common.

46. In combination with an internal combustion engine and its carburetor and with a supercharger therefor adapted to be operated by the engine, an engine starter drive adapted to be engaged with and to crank the engine for starting the same and to be operatively connected with the supercharger to operate it, and two trains for transmission of the torque to the supercharger from the engine and from the drive respectively, the train actuated by the engine being normally connected therewith, and the train actuated by the starter drive being normally disconnected therefrom.

47. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft which is operatively connected with the supercharger or disconnected therefrom according to its position longitudinally.

48. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft which in one position longitudinally connects the engine with the supercharger and in another position longitudinally connects the starter drive with the supercharger.

49. In combination with an internal combustion engine and its carburetor and with a supercharger therefor adapted to be operated by the engine, an engine starter drive adapted to be engaged with and to crank the engine for starting the same and to be operatively connected with the supercharger to operate it, and a rotatable inertia means, said drive including a rotatable longitudinally movable shaft which is normally disconnected from the supercharger and the inertia means but adapted to be connected therewith at the will of the operator.

50. In combination with an internal combustion engine and its carburetor and with a supercharger therefor adapted to be operated by the engine, an engine starter drive adapted to be engaged with and to crank the engine for starting the same and to be operatively connected with the supercharger to operate it, and a rotatable inertia means, said drive including a rotatable longitudinally movable shaft which is normally disconnected from the supercharger and the inertia means but adapted to be connected therewith at the will of the operator, and means for automatically disconnecting the supercharger and the inertia means from the shaft when the engine operates under its own power.

51. In combination with an internal combustion engine and its carburetor and with a supercharger therefor adapted to be operated by the engine, an engine starter drive adapted to be engaged with and to crank the engine for starting the same and to be operatively connected with the supercharger to operate it, and a rotatable inertia means, said drive including a rotatable longitudinally movable shaft which is normally disconnected from the supercharger and the inertia means but adapted to be connected therewith at the will of the operator, and means controlled by screw action for automatically disconnecting the supercharger and the inertia means from the shaft when the engine operates under its own power.

52. In combination with an internal combustion engine and its carburetor and with a supercharger therefor adapted to be operated by the engine, a starter drive, means for operatively connecting the starter drive with the supercharger at the will of the operator and independently of the engine, and means for automatically breaking such operating connection when the engine operates under its own power.

53. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable actuating and controlling shaft, and said supercharger including a rotatable blower element concentric of the shaft.

54. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, and actuating means for moving such shaft longitudinally and then rotating the same.

55. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, and power means and manually operated means connectable with such shaft for actuating it.

56. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, power means and manually operated means connectable with such shaft for actuating it, and means controlled by the power means and the manual means for moving the shaft longitudinally.

57. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, power means and manually operated means connectable with such shaft for actuating it, a shifter device cooperating with such shaft to move it longitudinally, and operating connections controlled by the power means and manual means for actuating such device.

58. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, power means and manually operated means connectable with such shaft for actuating it, a shifter device cooperating with such shaft to move it longitudinally, and means operated as an incident to the use of either the power means or the manual means for actuating the shifter.

59. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, power means and manually operated means connectable with such shaft for actuating it, a shifter device cooperating with such shaft to move it longitudinally, a rod operated as an incident to the use of the manual means for actuating the shifter device, and a second rod operated as an incident to the use of the power means for actuating such device.

60. In combination with an internal combustion engine and its carburetor and with a supercharger therefor adapted to be operated by the engine, an engine starter drive adapted to be engaged with and to crank the engine for starting the same and to be operatively connected with the supercharger to operate it, said drive including a rotatable longitudinally movable shaft and a normally disconnected connection with the supercharger, and actuating means for moving such shaft longitudinally and then rotating the same, such power means being in the form of an electric motor having an armature shaft, and such manual means including a cranking shaft, and means controlled by such shafts for moving said shaft longitudinally.

61. In combination with an internal combustion engine and its carburetor and with a supercharger therefor adapted to be operated by the engine, an engine starter drive adapted to be engaged with and to crank the engine for starting the same and to be operatively connected with the supercharger to operate it, and power means and manually operated means operatively connected with such starter drive.

62. In combination with an internal combustion engine and its carburetor and with a supercharger adapted to be operated by the engine, a transmission between the engine and supercharger, and an engine starter adapted to cooperate with such transmission to crank the engine.

63. In combination with an internal combustion engine and its carburetor and with a supercharger adapted to be operated by the engine, a transmission between the engine and supercharger, and an engine starter adapted to cooperate with such transmission to crank the engine, said transmission including a one-way clutch through which the torque is transmitted to the supercharger.

64. In combination with an internal combustion engine and its carburetor and with a supercharger adapted to be operated by the engine, a transmission between the engine and supercharger, and an engine starter adapted to cooperate with such transmission to crank the engine, said transmission including a yieldable clutch.

65. In combination with an internal combustion engine and its carburetor and with a supercharger adapted to be operated by the engine, a transmission between the engine and supercharger, and an engine starter adapted to cooperate with such transmission to crank the engine and including an inertia means, said transmission being normally in driving engagement with the engine but adapted to be disengaged therefrom when the inertia means is being accelerated.

66. In combination with an internal combustion engine and its carburetor and with a supercharger adapted to be operated by the engine, a transmission between the engine and supercharger, and an engine starter adapted to cooperate with such transmission to crank the engine and including an inertia means, said transmission being normally in driving engagement with the engine but adapted to be automatically disengaged therefrom as an incident to the actuation of the starter and when the inertia means is being accelerated.

67. In combination with an internal combustion engine and its carburetor and with a supercharger adapted to be operated by the engine, a transmission between the engine and supercharger, and an engine starter adapted to cooperate with such transmission to crank the engine and including an inertia means, said transmission being normally in driving engagement with the engine but adapted to be automatically disengaged therefrom as an incident to the actuation of the starter and when the inertia means is being accelerated and to be automatically engaged with the engine as an incident to the cessation of such actuation.

68. In combination with an internal combustion engine and its carburetor and with a supercharger adapted to be operated by the engine, a transmission between the engine and supercharger, and an engine starter adapted to cooperate with such transmission to crank the engine and adapted to cooperate with said supercharger to operate it during the cranking of the engine.

69. In combination with an internal combustion engine and its carburetor, an engine starter comprising actuating means and means for connecting said actuating means with a part of the engine, and a supercharger operatively associated with said connecting means to be engine-operated through said connecting means.

70. In combination with an internal combustion engine, an inertia starter including a high speed flywheel and reduction gearing, an engine accessory including a rotatable member adapted to be driven by said flywheel through said gearing, means for rotating the flywheel to store energy therein for starting the engine, said starter being disconnected from the engine during the energization of said flywheel, and means for drivably connecting the flywheel to the engine through said gearing.

71. In combination, a member adapted for driving engagement with a member of an engine to be started, a supercharger element adapted to be driven by the engine through said first named member, an engine starter adapted to drive said first named member, and common means for drivably connecting said starter and first named member and for drivably connecting the latter to said supercharger element whereby said element may be driven by the engine.

72. In combination with an internal combustion engine, a supercharger member adapted to be driven by the engine, a starting device for the engine, and means including a friction clutch for drivably connecting the starter to said engine and for establishing the driving connection between the engine and said supercharger member.

73. In combination with a member of an internal combustion engine, a supercharger including a rotatable element adapted to be driven by the engine, a starting device for the engine, and common overload release means for establishing a driving connection between the starting device and said member and between the latter and said rotatable element.

74. In combination with an internal combustion engine, a member adapted to engage and crank a member of said engine, a supercharger for charging the cylinders of the engine with a combustible mixture, means for actuating the supercharger prior to the cranking operation to preliminarily charge the cylinders, and means for operatively connecting the first-named means and the cranking member whereby the first-named means actuates the cranking member after the cylinders have been preliminarily charged.

75. In combination with an internal combustion engine, a starter for said engine, said starter being normally disconnected from the engine, a supercharger for charging the cylinders of the engine with a combustible mixture, and means operatively connecting the starter and supercharger, said starter being adapted to actuate the supercharger prior to the starting operation to preliminarily charge the cylinders.

76. In combination with an internal combustion engine, an engine starter drive adapted to be engaged with and to crank the engine for starting the same, inertia means including a supercharger drivably connected with said starter drive, means for actuating said inertia means and storing energy therein, and means for engaging said starter drive with the engine whereby the energy stored in said inertia means may be transferred to the engine for cranking the same.

77. In combination with an internal combustion engine, a starter for said engine, means for introducing a hydrocarbon into the cylinders of the engine, and means operatively connecting the starter and said first named means, said starter being adapted to actuate said first named means prior to the starting operation to preliminarily introduce a hydrocarbon into the cylinders.

78. In combination with an internal combustion engine, a starter for said engine, said starter being normally disconnected from the engine, pumping means for introducing a hydrocarbon into the cylinders of the engine, said pumping means being normally connected to said engine, and means for operatively connecting the starter and pumping means whereby the latter may be actuated by the starter prior to the starting operation, independently of the engine, to preliminarily introduce a hydrocarbon into the cylinders.

79. In combination with an internal combustion engine, means for supplying a hydrocarbon to the cylinders of said engine, a normally operative driving connection between the engine and said means, an engine starter, and means for rendering said driving connection inoperative and for actuating said first named means by the starter prior to the starting operation to preliminarily supply a hydrocarbon to the cylinders of the engine.

80. In combination with an internal combustion engine, a supercharger adapted to be driven by the engine, speed multiplying means between the engine and supercharger, and engine starting apparatus adapted to be drivably connected with said means for cranking the engine, said means serving as a speed reduction means with respect to the starting apparatus during the cranking operation.

81. In combination with an internal combustion engine having a carburetor, a supercharger cooperating with said carburetor, starting apparatus having a drivable connection with the supercharger and a disengageable connection with the engine, means for connecting the starting apparatus with the engine and for causing it to operate to rotate both engine and supercharger, and means for causing the starting apparatus to operate to rotate the supercharger alone.

In testimony whereof, I have subscribed my name.

RAYMOND P. LANSING.